United States Patent Office
2,737,527
Patented Mar. 6, 1956

2,737,527

PRODUCTION OF PHENOLS AND CARBONYL COMPOUNDS

Michel Marius Mosnier, Lyon (Rhone), France, assignor to Societe des Usines Chimiques Rhone Poulenc, Paris, France No Drawing. Application May 15, 1952,
Serial No. 288,063

Claims priority, application France July 9, 1951

13 Claims. (Cl. 260—593)

This invention is for improvements in or relating to the simultaneous production of phenols and carbonyl compounds by the decomposition of certain hydroperoxides.

Phenols and carbonyl compounds (aldehydes or ketones) may be simultaneously produced by decomposing the hydroperoxides of cumene and homologous alkylaromatic hydrocarbons by means of a suitable catalyst, of which aqueous sulphuric acid of varying concentration is believed to be the most active and economical. Despite its undoubted utility in this connection, sulphuric acid, however, can give rise to definite manipulative disadvantages and the present applicants have conducted considerable research and experimentation on the fission process employing sulphuric acid in an endeavour to ascertain the optimum conditions. In the result, they discovered that the aforesaid disadvantages could be eliminated or at least minimised by bringing together the hydroperoxide and the sulphuric acid at elevated temperature in the presence of a quantity of the phenol to be formed in the fission reaction. In particular, it was found that in this way the quantity of aqueous sulphuric acid required could be reduced such that the amount soluble in a reasonable quantity of the phenol would suffice, thereby making possible a homogeneous reaction medium which considerably facilitates the separation of the fission products.

As a result of further research, it has now unexpectedly been found that, in this improved process, the sulphuric acid can be replaced by perchloric acid and still further advantage obtained, as will be more particularly referred to hereinafter.

The process of the present invention, therefore, is essentially characterised by bringing the hydroperoxide into contact with perchloric acid at elevated temperature in the presence of the phenol which is formed in the fission reaction, this phenol being introduced before the commencement of the reaction. It has been found that, under these conditions, the quantity of acid required to bring about the reaction is so small that it is a practical matter, and this constitutes a preferred feature of the invention, to employ as catalyst a quantity of aqueous perchloric acid which is soluble in a reasonable quantity of the said phenol and thereby ensure a homogeneous reaction medium. As will appear from the examples given hereinafter, quantities of aqueous perchloric acid of the order of 0.05 per cent based upon quantity of hydroperoxide employed and calculated as pure acid give excellent results. On the other hand, however, more than about 1 per cent calculated as aforesaid is preferably avoided since, as the reaction is exothermic, there is then the distinct possibility of local overheating which is detrimental to a good yield of the desired end products.

The hydroperoxides to which the process is applicable are cumene hydroperoxide and the hydroperoxides of alkylaromatic derivatives which are homologues of cumene, the alkyl group of which contains a secondary or tertiary carbon atom. Those homologues in which the hydroperoxide function is attached to a tertiary carbon atom of the alkyl group are, for example, the hydroperoxides of p-cymene, α-methyl-n-propylbenzene and di-isopropylbenzene. An example of a homologue of cumene hydroperoxide in which the hydroperoxide function is attached to a secondary alkyl carbon atom is ethylbenzene hydroperoxide. The fission of these homologues takes place in accordance with the same reaction scheme as for cumene hydroperoxide and yields the aliphatic ketone or aldehyde corresponding to the alkyl group of the starting material (being a ketone when that alkyl group contains a tertiary carbon atom or an aldehyde when the alkyl group contains a secondary carbon atom) together with the phenol corresponding to the aromatic nucleus, which may be substituted according to the nature of the hydroperoxide starting material. Thus, the hydroperoxide of p-cymene gives p-cresol and acetone; the hydroperoxide of α-methyl-n-propylbenzene gives phenol and methyl ethyl ketone; and the hydroperoxide of ethylbenzene gives phenol and acetaldehyde.

In carrying the process of the present invention into effect, the hydroperoxide may be previously admixed with the corresponding phenol before being reacted with the perchloric acid, but it is usually more convenient to bring the perchloric acid and the hydroperoxide into contact by simultaneous addition to a hot mass of liquid phenol. In the following description such mass will, for the sake of brevity, be termed a "foot."

The small quantity of perchloric acid necessary in the process is completely soluble in the "foot" so that the process of the invention in its preferred embodiment comprises a reaction medium which is homogeneous from the outset and which remains so even with the subsequent addition of further quantities of acid and hydroperoxide. The phenol employed is, of course, the same as that which is to be formed by the fission reaction. It is not necessary that the "foot" should consist of the pure phenol but merely that it should contain the phenol in predominating proportion. Thus, the "foot" may consist of a mixture of phenol and ketone (or aldehyde) obtained in a preceding fission operation using the same hydroperoxide, which mixture may, therefore, contain up to an equimolecular proportion of the ketone or aldehyde.

It is also unnecessary to employ an absolutely pure cumene hydroperoxide, since there may be employed a crude product which results from the partial oxidation of cumene, after such product has been freed from the greater part of the excess of unconverted hydrocarbon by distillation and/or steam distillation. In the case of cumene, a product obtained under these conditions and containing, for example, 5% of cumene and 5% of water is quite suitable for carrying out the process according to the invention with the use of a 70% perchloric acid solution. It is to be noted that the figure of 5% for the content of water and of cumene in the crude hydroperoxide respectively, is hereinbefore referred to only by way of example. A higher cumene content can be tolerated in the case of a hydroperoxide containing less water, for example 10% of cumene, for a completely anhydrous hydroperoxide. However, it is desirable, with a view to deriving the greatest advantage from the invention and in particular to working in a practically homogeneous medium, to use hydroperoxides of good purity such as those specifically described in the following examples.

The process is advantageously carried out at a temperature which is preferably lower than 65° C. in order to avoid any side reaction between the perchloric acid and the fission products. The operation may be continuously performed by bringing into contact corresponding quantities of hydroperoxide and of acid as hereinbefore indicated for cumene, in a "foot" consisting of the phenol. The rate at which the reagents are introduced depends only upon the extent to which it is possible under the conditions employed to remove, by cooling, the heat liberated by the fission reaction. A volume of the reaction mixture equal to that of the reagents introduced is continuously removed from the reaction apparatus and is suitably treated to separate the desired products therefrom. If desired, the operation can be conducted under temperature and pressure conditions such that the carbonyl derivative formed in the reaction is substantially eliminated in the proportion in which it is formed.

The phenol and ketone (or aldehyde) yields obtained by the process of the present invention are at least equal to but are generally greater than those obtained in the known processes.

The advantages afforded by the process according to the invention, in its preferred embodiment, as compared with the known processes, include the following: Owing to the homogeneity of the reaction medium, only a moderate agitation is required in bringing the reagents into contact; owing to the small quantity of perchloric acid employed, the economy of the process does not necessitate the re-use of this reagent as in the earlier processes; the almost instantaneous nature of the reaction, due to the solubility of the perchloric acid in the phenol, eliminates the danger of delays followed by violent reaction; and secondary reactions are minimised. As compared with sulphuric acid, perchloric acid also affords the advantage that it can be employed in a smaller proportion. Thus, while quantities corresponding to 1% to 5% of cumene hydroperoxide represent in this case favourable limits in the case of sulphuric acid, perchloric acid gives good results with quantities 10 times smaller. By way of illustration, and as already mentioned, 0.05% of perchloric acid is sufficient to give excellent results.

In the following examples, in which the parts and percentages are by weight except where otherwise indicated, methods of carrying the invention into effect are described by way of non-limitative example. When parts by volume are mentioned, they are in the same proportion to the parts by weight as litres to kilograms.

*Example I*

75.3 parts by weight of an equimolecular mixture of phenol and acetone are introduced into a vessel provided with an agitator and cooling means. The mixture is heated to 40° C. and 155.2 parts by weight of cumene hydroperoxide containing 88.8% of pure hydroperoxide together with 0.35 part by volume of 93% by weight aqueous perchloric acid are simultaneously run in. The temperature is maintained at between 40° and 50° C. The reaction mixture passes continuously into a second vessel in which the reaction is completed. The hydroperoxide content falls to less than 0.1%.

In a third vessel, the perchloric acid is continuously neutralised by means of aqueous caustic soda solution. From this vessel, the liquid passes to a decanter in which an aqueous layer containing sodium perchlorate and an organic layer are separated. The latter is fractionated and phenol and acetone are obtained in yields of 94% and 96% calculated on the cumene hydroperoxide employed.

*Example II*

The procedure of Example I is followed, but the 88.8% cumene hydroperoxide is replaced by a less pure hydroperoxide containing 84% of hydroperoxide, 4% of water, 1.5% of cumene, 9% of phenyl-dimethyl-carbinol and 1.5% of acetophenone.

A phenol yield of 95.5% is obtained.

*Example III*

Into an apparatus provided with an agitator, a cooling system and a condenser system cooled by means of brine to —15° C., are introduced 50 parts of phenol and 0.25 part of 93% aqueous perchloric acid. A vacuum of from 90 to 100 mm. is set up and the temperature is raised to 55° C. 1000 parts of 99% cumene hydroperoxide and 5 parts of 93% perchloric acid are then simultaneously and continuously run in per hour.

The cumene hydroperoxide is split into phenol and acetone, the latter distilling off and condensing in the brine-cooled condenser system.

The temperature of the reaction mixture is maintained at 50°–55° C. by virtue of the evaporation of the acetone and by the additional cooling means supplied.

The reaction mixture containing the phenol and the perchloric acid with less than 10% of acetone is neutralised and subjected to distillation.

The acetone and phenol yields are 95% respectively.

I claim:

1. A process for the production of phenols and carbonyl compounds which comprises bringing together a hydroperoxide of an alkyl aromatic hydrocarbon of which the alkyl group contains a secondary carbon atom directly attached to the aromatic nucleus and aqueous perchloric acid in the presence of a quantity of the phenol to be formed in the reaction, the perchloric acid solution dissolving in the phenol to form a homogeneous reaction medium and the phenol being introduced prior to the commencement of the reaction.

2. A process for the production of phenols and carbonyl compounds which comprises bringing together a hydroperoxide of an alkyl aromatic hydrocarbon of which the alkyl group contains a tertiary carbon atom directly attached to the aromatic nucleus and aqueous perchloric acid in the presence of a quantity of the phenol to be formed in the reaction, the perchloric acid solution dissolving in the phenol to form a homogeneous reaction medium and the phenol being introduced prior to the commencement of the reaction.

3. A process for the production of phenols and carbonyl compounds by the decomposition by means of perchloric acid of a hydroperoxide of an alkyl aromatic hydrocarbon, of which the alkyl group contains a carbon atom selected from the class consisting of secondary and tertiary carbon atoms, said carbon atom being directly attached to the aromatic nucleus, wherein the substantially pure hydroperoxide and perchloric acid are brought into contact at elevated temperature in the presence of a quantity of the phenol to be formed in the reaction to form a homogeneous reaction medium, the acid being employed in the form of an aqueous solution containing not more than 1% by weight of pure acid based upon the hydroperoxide employed and the quantity of the phenol added is at least sufficient to dissolve the aqueous acid.

4. A process for the production of phenols and carbonyl compounds by the decomposition by means of perchloric acid of a hydroperoxide of an alkyl aromatic hydrocarbon, of which the alkyl group contains a carbon atom selected from the class consisting of secondary and tertiary carbon atoms, said carbon atom being directly attached to the aromatic nucleus, wherein the substantially pure hydroperoxide and perchloric acid are brought into contact at elevated temperature in the presence of a mixture of the phenol to be formed in the reaction with not more than 10% of the carbonyl compound also to be so formed to form a homogeneous reaction medium, said mixture being introduced before the reaction commences, the acid being employed in the form of an aqueous solution containing not more than 1% by weight of pure acid based upon the hydroperoxide employed and the quantity of the phenol added is at least sufficient to dissolve the aqueous acid.

5. A process for the production of phenols and carbonyl compounds by the decomposition by means of perchloric acid of a hydroperoxide of an alkyl aromatic hydrocarbon selected from the class consisting of alkyl aromatic hydrocarbons, of which the alkyl group contains a secondary carbon atom directly attached to the aromatic nucleus and alkyl aromatic hydrocarbons of which the alkyl group contains a tertiary carbon atom directly attached to the aromatic nucleus, wherein the hydroperoxide and the perchloric acid are brought into contact at elevated temperature in the presence of a quantity of the phenol to be formed in the reaction to form a homogeneous reaction medium, said phenol being introduced before the reaction has commenced.

6. A process according to claim 5 in which the reaction is initiated in a liquid mass of the said phenol containing not more than 10% by weight of the carbonyl compound also formed in the fission reaction.

7. A process according to claim 5 wherein the hydroperoxide contains not more than a total of about 10% by weight of the hydrocarbon from which it is derived and of water.

8. A process according to claim 5 wherein the reaction is effected at moderately elevated temperature i. e. a temperature less than 65° C.

9. A process for the production of phenols and carbonyl compounds by the decomposition by means of perchloric acid of a hydroperoxide of an alkyl aromatic hydrocarbon selected from the class consisting of alkyl aromatic hydrocarbons, of which the alkyl group contains a secondary carbon atom directly attached to the aromatic nucleus and alkyl aromatic hydrocarbons of which the alkyl group contains a tertiary carbon atom directly attached to the aromatic nucleus, wherein the hydroperoxide and the perchloric acid are brought into contact at elevated temperature in the presence of a quantity of the phenol to be formed in the reaction to form a homogeneous reaction medium, said phenol being introduced before the reaction has commenced, the hydroperoxide and the acid are simultaneously and continuously run into a heated mass of the said phenol, the temperature of the reaction mixture is maintained below 65° C., and the fission products are continuously removed at a rate such as to maintain substantially constant the volume of the reaction mixture.

10. A process for the production of phenol and acetone by the decomposition of cumene hydroperoxide when effected in the manner set forth in claim 9.

11. A process for the production of p-cresol and acetone by the decomposition of p-cymene hydroperoxide when effected in the manner set forth in claim 9.

12. A process for the production of phenol and methylethyl ketone by the decomposition of $\alpha$-methyl-n-propylbenzene hydroperoxide when effected in the manner set forth in claim 9.

13. A process for the production of phenol and acetaldehyde by the decomposition of ethylbenzene hydroperoxide when effected in the manner set forth in claim 9.

References Cited in the file of this patent

UNITED STATES PATENTS 2,663,735    Filar et al. _____ Dec. 22, 1953

FOREIGN PATENTS 629,429    Great Britain _____ Sept. 20, 1949

OTHER REFERENCES

Kharasch et al.: Jour. Organic Chem., vol. 15, pp. 748–752 (July 1950) (5 pages).